US008471675B2

(12) United States Patent
Couto et al.

(10) Patent No.: US 8,471,675 B2
(45) Date of Patent: Jun. 25, 2013

(54) METHOD FOR MANAGING LOCKERS REMOTELY

(75) Inventors: Renato Dale Couto, Rio de Janeiro RJ (BR); Francisco Leao Diegues, Rio de Janeiro RJ (BR)

(73) Assignee: Thatsit Systems LLC, Rio de Janeiro (BR)

( * ) Notice: Subject to any disclaimer, the term of this patent is extended or adjusted under 35 U.S.C. 154(b) by 1073 days.

(21) Appl. No.: 12/108,938

(22) Filed: Apr. 24, 2008

(65) Prior Publication Data

US 2009/0267788 A1 Oct. 29, 2009

(51) Int. Cl.

*B60R 25/00* (2006.01)
*G05B 19/00* (2006.01)
*G06F 7/04* (2006.01)
*H04Q 9/00* (2006.01)

(52) U.S. Cl.

USPC ........................... 340/4.61; 340/5.73; 340/5.2

(58) Field of Classification Search

USPC ............................. 340/825.29, 825, 5.73, 5.2

See application file for complete search history.

(56) References Cited

U.S. PATENT DOCUMENTS

| | | | | |
|---|---|---|---|---|
| 5,894,227 | A * | 4/1999 | Acuff | 326/68 |
| 6,879,243 | B1 * | 4/2005 | Booth et al. | 340/5.73 |
| 6,882,269 | B2 * | 4/2005 | Moreno | 340/5.73 |
| 7,113,071 | B2 * | 9/2006 | Cayne et al. | 340/5.22 |
| 7,323,967 | B2 * | 1/2008 | Booth et al. | 340/5.73 |
| 7,477,132 | B2 * | 1/2009 | Mayer et al. | 340/5.73 |
| 7,675,421 | B2 * | 3/2010 | Higham | 340/572.1 |
| 7,728,711 | B2 * | 6/2010 | Shoenfeld | 340/5.73 |
| 2003/0025590 | A1 * | 2/2003 | Gokcebay et al. | 340/5.73 |
| 2003/0101254 | A1 * | 5/2003 | Sato | 709/223 |

* cited by examiner

*Primary Examiner* — Daniel Wu
*Assistant Examiner* — Mohamed Barakat
(74) *Attorney, Agent, or Firm* — Alston & Bird LLP

(57) ABSTRACT

A method capable of remotely managing the implementation, the installation control and use of cabinets or storage lockers at any location over the Internet, through communication between databases that interconnect the end user needs with the capacities and needs of the location that makes the lockers available.

13 Claims, No Drawings

METHOD FOR MANAGING LOCKERS REMOTELY

BACKGROUND OF THE INVENTION

The present invention relates to a method for managing lockers remotely, both in quantitative implementation and in maintenance and control.

Lockers have been widely used for years in schools, gyms, airports, train and bus stations, sports and cultural clubs and associations for convenience, security and health reasons.

Studies all over the world by all kinds of experts show that people should not carry loads over 10% of their body weight. The hazard is more evident and dramatic for teenagers at growth age. They are the ones currently carrying the heaviest loads while they are still building their bodies, which may cause irreversible damages to their vertebral spine.

That is why the use of storage lockers, or cabinets, is quite common in schools enabling students to store their textbooks and personal belongings, thus avoiding losses and rationalizing the daily carrying of study materials, since the students will only carry home the books and materials needed for their daily tasks.

However, the traditional and current way of managing school lockers is dominated by labor-intensive manual processes that are difficult to control, and subject to error and even fraud. The complexity of the operations increases when there is a need to deal with multiple schools in multiple locations at the same time.

In order to cope with the demand and service the principals and students appropriately, the school or third-party locker administrator typically must assign an employee or hire at least one temporary worker per location to perform the managerial tasks manually. In addition, there is usually a need to have at least one supervisor per location in order to establish some kind of servicing pattern.

Locker management has always been considered a hassle for those who make the space available and a source of complaint among those using the services, either in rental, free lease or purchase agreements.

The current procedure is carried out as follows: First, if there is no pre-installed locker, the principal determines the number and the installation sites of the lockers and orders them to the manufacturer for prompt delivery. Then, the principal determines the locker assignment criteria among the students and manually decides and controls who will be assigned to each locker. The students receive the combination or the key in their classrooms or at a designated place, and sign on the control spreadsheet.

Obviously, excessive time is dedicated to this procedure, which is then delegated to a subordinate. The tricky part is that such an easy procedure can become chaotic if one loses control, and it is still susceptible to error.

Once the keys or combinations are delivered, the control spreadsheet has to be well managed. All these steps represent labor-intensive activities. Furthermore, in the traditional approach, students cannot choose their lockers and most of the activities are concentrated on the fist days of classes, which is a critical time of the school year.

Objects of Embodiments of The Invention

Considering the scenario described above, a method is proposed that is capable of automatically and remotely managing the implementation and the control of lockers at any location.

An additional object of at least some embodiments of the invention is to eliminate most of the manual activities that created the need to keep a worker responsible for managing the lockers and provide organization and a service standard. The few activities that are not eliminated will be exclusively performed during vacation time or remotely from any computer connected to the Internet.

A further object of at least some embodiments of the invention is to reduce the costs of implementation by optimizing locker installation according to actual student demands.

DETAILED DESCRIPTION OF EMBODIMENTS OF THE INVENTION

The present invention relates to a method capable of remotely managing the implementation, the installation control and the mapping of use by users of cabinets or lockers at any location over the Internet, through communication between databases that interconnect the end user needs with the capacities and needs of the location that makes the lockers available.

The invention can enable the locker supplier to use lockers that already exist at their location or to create virtual lockers to be installed according to the actual student demand.

The management method of the present invention reduces to zero the need of physical interaction between the end user and the location where the locker is, and all the steps are carried out in the preparation phase in a remote and automatic way.

One of the possible embodiments for implementing the invention is to manage lockers that are already installed or that will be installed in universities. Firstly, the first user, in this specific case represented by the school principal or designated responsible person, provides the needed information to the system, such as the specifications and features of the lockers, the name of the school, the name of the principal, the number of students, the vacation period, the address, the characteristics of the school, the dimensions of the locations chosen for the installation of the lockers, among others.

This log automatically generates a first database with the space availability and the corresponding characteristics relevant to lockers and padlocks according to the information contained in the log of that institution. The first database information is therefore matched with the information prestored in a fixed database in order to arrange the best and optimum configuration of lockers. The fixed database includes information relating to the blocks of lockers. Each block of lockers is a set of lockers grouped together, which form a large rectangle of lockers. Each block of lockers has a horizontal and a vertical amount of lockers. This configuration of how many vertical lockers and how many horizontal lockers will be available is established according to the information provided by the school depending on the space available. Thus, each locker will have a location coordinate within each block and this will be the locker identification means for the student, the principal and the remote administrator of the locker. Each block of lockers also has a single identification number in the system.

The principal has remote access to a virtual graphic representation of the lockers, as if they had already been installed in the school hallways.

After this stage, other pieces of information are customized according to the needs of the school, such as terms and conditions of use by second users, in this case, the students, text messages that can be sent by e-mail, SMS, or any other data delivery means, containing optional information, such as reservation confirmation, padlock combination delivery, welcome information, fees, announcements, cancellation notices, promotions, etc.

The second users, in the case of the embodiment described above, the students, also provide certain information to the system, such as their name, their school, enrolment number, period of use of the locker, etc., and the log is confirmed by online acceptance. This information is stored in a second database.

As the lockers are virtually made available before actually being installed, the users should choose them in advance so the demand is precisely measured (in terms of quantity and location) maximizing the operation efficiency. Furthermore, each second user, in turn, is linked to a responsible user, who can be the capable second user him-/herself or a third user (in case of minor users). A responsible user may have more than one second user or student under his/her management, which is common in families with more than one child.

After confirmation of the desired locker, the combination can be sent automatically to all the students before the first day of class by means of an electronic communication such as a text message, e-mail, SMS, or the like. On the first day of school, all the students who chose their lockers in advance have immediate access to them without the need for human interaction.

The padlock combinations can be sent automatically by e-mail or any other text message, and can be made available at the user's log, already on hand when the reservation was made. It should be noted that the first user, the school principal, has access to a private space for first users with specific and real-time user statistics and data, allowing total control of locker use and enabling immediate analysis and the possible reconfiguration of locker assignment according to the actual student demand in terms of quantity and installation site, if applicable. Moreover, the present invention further enables the principal to inform the students ahead of time about the end of the term of the locker contract and the consequent need to empty the locker to make it available for the next year's students. The first user can also know exactly which lockers were not emptied having the option to send text messages to the second users in these conditions.

Therefore, it should be understood that the subject matter of the present invention and its steps described above are part of some of the preferred embodiments and of examples of situations that could happen; however, the real scope of the subject matter of the invention is defined in the claims.

What is claimed is:

1. A method for managing lockers remotely, comprising the steps of:

a) storing in a first database information inserted by a first user;

b) matching the first database information with information in a fixed database;

c) generating a virtual graphic representation based on the information inserted by the first user and defined by at least one virtual array of array elements arranged in rows and columns, wherein each array element represents a locker;

d) storing in a second database information inserted by a second user;

e) displaying to the second user the virtual graphic representation generated in step c);

f) enabling at least one locker array element to be designated as belonging to the second user;

g) sending at least one notification to the second user with the information regarding the enabled locker array element;

h) providing a user's log for the second user, based on the second database, wherein access to the user's log enables the second user to manage or edit the information in the user's log; and wherein the user's log for second users comprises information selected from the group consisting of confirmation of reservation or release of the locker array element, padlock secret, welcome information, billing, announcements, and canceling notices.

2. The method according to claim 1, wherein the step of storing in the first database the information inserted by the first user comprises the step of storing data selected from fields including at least a name of the first user, a name of a first responsible user, an amount of second users, dates, an address of the first user, and physical space available for implementing the lockers.

3. The method according to claim 1, wherein the step of generating a virtual graphic representation based on the information inserted by the first user defines a virtual array of rows and columns of lockers created according to the physical space as defined in step a).

4. The method according to claim 1, wherein the step of storing in a second database the information inserted by the second user comprises the step of storing data selected from fields including at least a name of the second user, a name of a responsible user, a name of the first user with whom the second user is associated, dates, an address of the second user, and a period of use.

5. The method according to claim 1, wherein the fixed database is pre-stored with the characteristics relevant to lockers, padlocks and the block of lockers arranged with a vertical and horizontal amount of lockers.

6. The method according to claim 1, wherein the step of sending at least one notification to the second user comprises sending an electronic communication.

7. The method according to claim 1, wherein the notification sent to the second user comprises information selected from at least a confirmation of reservation or release of the locker array element, a padlock secret, welcome information, billing, announcements, and canceling notices.

8. The method according to claim 1, wherein the information also can be inserted by a responsible user.

9. The method according to claim 8, wherein the responsible user can administrate at least one second user.

10. The method according to claim 1, further comprising the step of making available to the first user a report containing statistics and second user's specific data in real-time.

11. The method according to claim 1, further comprising the steps of canceling at least one locker array element previously reserved as belonging to the second user;

and sending at least one notification to the first and second users with the information regarding the released locker array element.

12. The method according to claim 1, wherein the fixed database is in communication with the first database.

13. The method according to claim 1, wherein the first database is in communication with the second database.

* * * * *